Oct. 13, 1970   P. E. CANCIENNE   3,533,525
SUGAR CANE VEHICLE AND APPARATUS FOR
LOADING AND UNLOADING SAME
Filed Dec. 11, 1968   2 Sheets-Sheet 1
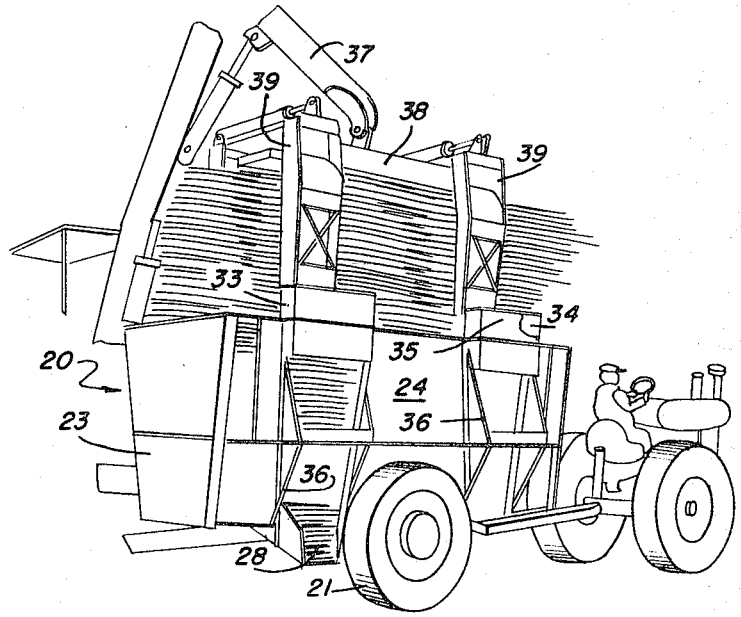
FIG. I
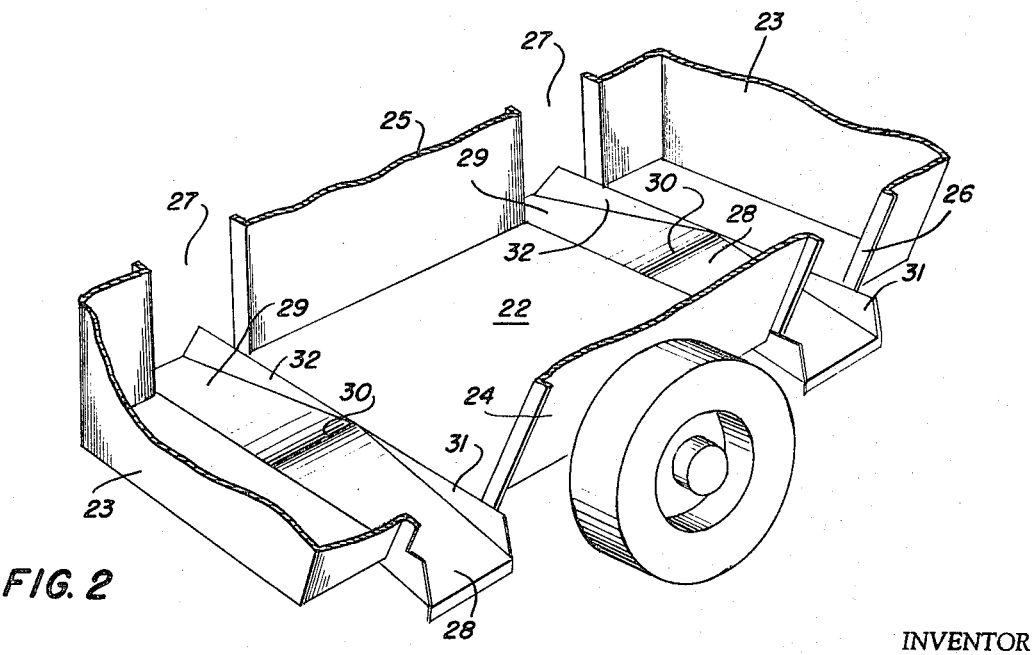
FIG. 2
INVENTOR
PATRICK E. CANCIENNE
BY Wilkinson, Mawhinney and Thiebault
ATTORNEYS

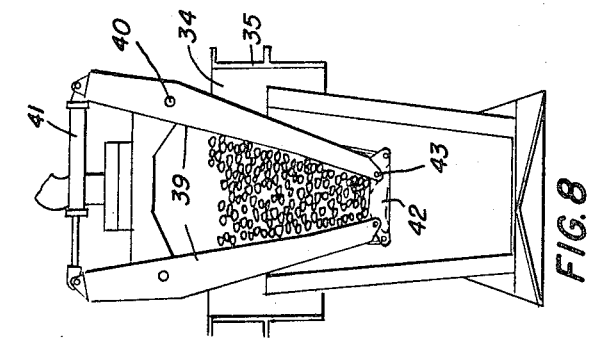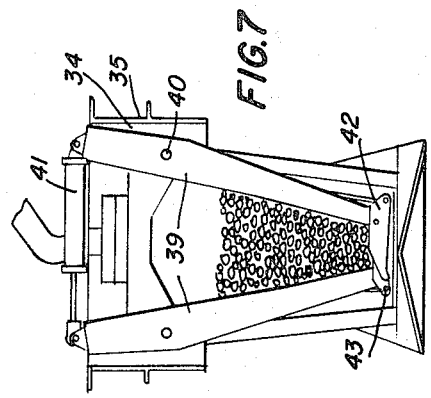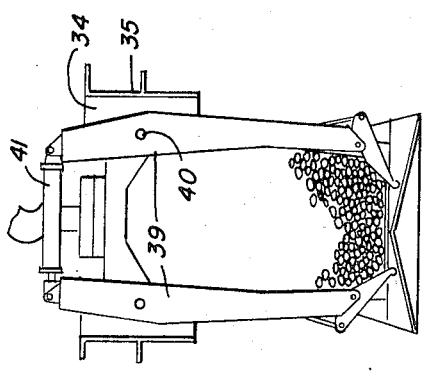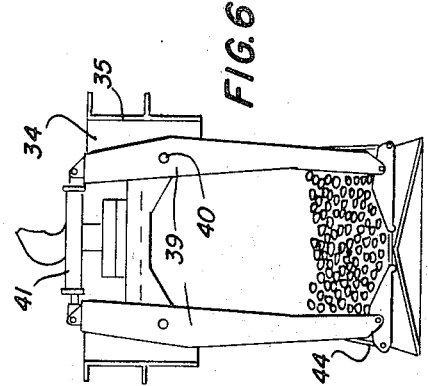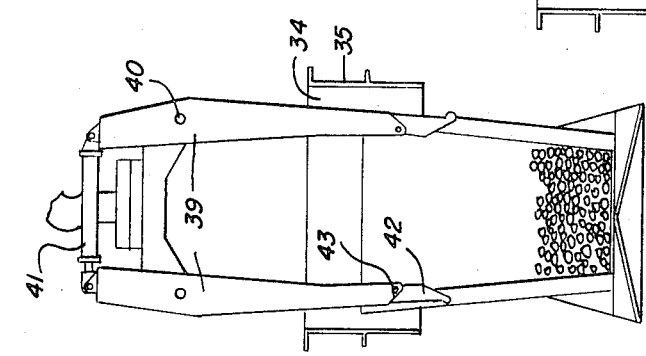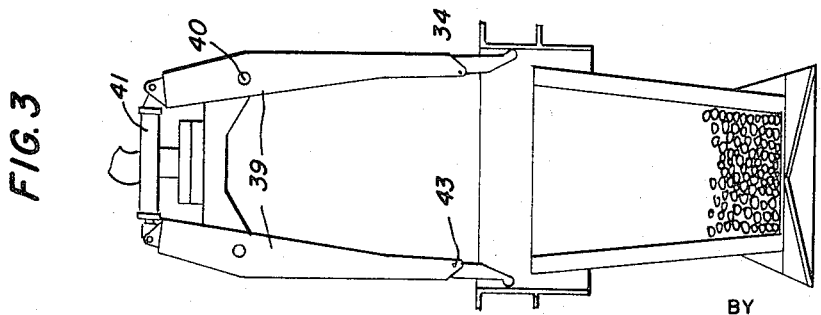

`United States Patent Office`

3,533,525
Patented Oct. 13, 1970

3,533,525
SUGAR CANE VEHICLE AND APPARATUS FOR LOADING AND UNLOADING SAME
Patrick Edward Cancienne, Belle Rose, La., assignor to Lula Factory, Inc., Belle Rose, La., a corporation of Louisiana
Filed Dec. 11, 1968, Ser. No. 782,896
Int. Cl. B65g 67/02
U.S. Cl. 214—38                               3 Claims

ABSTRACT OF THE DISCLOSURE

A cane cart for use in receiving recently harvested loose cane stalks (canes) having end and side walls to confine the canes modified by one or more pairs of laterally opposed longitudinally spaced slots in the side walls and one or more cross troughs in and below the bottom or deck to enable the legs and foot members of a crane to gain access to the bundle of loose canes in the cart for lifting the canes out of the cart further modified by the provision of vertical guide channel members offset outwardly of the side walls in lateral alignment with the slots for visually spotting the slots and for receiving downwardly therethrough the legs of the crane having foot members to enter the trough from opposite sides of the cart.

---

The present invention relates to sugar cane vehicles and apparatus for loading and unloading same and has for an object to provide a cane cart modified from standard practice to enable the unloading of the canes with greater facility and by the use of a specially formed crane grab.

In cane growing areas, notably in southwestern Louisiana, trains of cane carts drawn by tractors move through the fields following the harvesters which latter cut the stalks top and bottom and deposit them crosswise on already harvested hills from which the canes are lifted by mechanized grabs and deposited in the cane carts for local transfer to a field station where a crane removes the canes from the carts and deposits same in large capacity trucks for transfer to the sugar house where the juice is expressed and other operations performed incident to the refining of sugar cane.

Heretofore heavy chains have been laid manually crosswise of the empty carts. When loaded to prescribed capacity, the chains are manually brought together above the canes where the ends are secured together forming bound bundles, which latter are lifted out of the carts by cranes and deposited in the trucks.

In handling the heavy chains many accidents have been encountered by personnel with injurious results, sometimes permanent, and with high insurance liability. The use of chains is also objectionable on account of the time factor in first laying the chains in proper position, maintaining same in such position during loading and later fastening.

It is an object of the present invention to dispense completely with the use of such chains and their attendant disadvantages and to modify the construction of the cane cart so that it will cooperate in a novel manner with a crane of special construction to the end that the canes may be more expeditiously deposited in the carts in loose bundles and removed from the carts and transferred to the trucks in like condition with a considerable saving in time and with a substantially less hazard to injury to field hands.

Other objects of the invention are to dispense with the costs of the chains and fastening means, to reduce personnel and costs thereof and to economize in terms of time in making final delivery of the harvested canes to the mill often an important item in yield value of the cane.

With the foregoing and other objects in view, the invention will be more fully described hereinafter, and will be more particularly pointed out in the claims appended hereto.

In the drawings, wherein like symbols refer to like or corresponding parts throughout the several views:

FIG. 1 is a perspective view of a cane cart and crane according to the invention in the act of removing the cane from the cart;

FIG. 2 is a fragmentary perspective view of the cart with parts broken away and parts shown in section; and FIGS. 3 to 8, inclusive, are diagrammatic views illustrating the mode of removing the cane from the cart by the crane.

Referring more particularly to the drawings, 20 designates generally the frame or body of a conventional cane cart which, as is the current custom, is supported for movement on two wheels 21. The body includes the usual floor or deck 22, the end walls 23 and the side walls 24 and 25.

According to the invention the side walls 24 and 25 are modified to provide at least one pair, and preferably two pairs, of slots 26 and 27. In the drawings, showing one form of the invention, two pairs of such slots are illustrated, one pair to one side of the transverse center line of the cart body and the other equally spaced to the other side of such center line. The pairs of slots 26 and 27 are in transverse and horizontal alignment. The slots open through the upper edges of the side walls 24 and 25 and extend all the way down to the deck 22.

In alignment with the slots 26 and 27 are cross troughs depressed below deck level. The bottom walls 28 and 29 of the cross troughs are inclined in opposite directions outwardly and downwardly from a central ridge 30 and preferably extend beyond the side walls 24 and 25 and beyond the side edges of the deck 22. The cross troughs are enclosed by side walls 31 and 32 which also preferably extend beyond the lines of the vehicle side walls 24 and 25.

Guide channel members are also preferably associated with the pairs of slots 26, 27, at least at upper portions of the vehicle body side walls 24 and 25. The guide channel members are shown to be four in number, one associated with each slot 26, 27 and comprise side walls 33 and 34 and an outer wall 35 connecting outer edges of the side walls 33 and 34 and preferably parallel with the vehicle body side walls 24 and 25. The walls of the guide channel members may be supported as by suitable bracing 36 affixed to the body of the cart.

It will be seen that the guide channel members provide substantially vertical guide channels boxed in on three sides by the walls 33, 34 and 35 and in open communication with the respective pairs of slots 26, 27 made through the side walls 24 and 25 of the wagon box but such vertical channels are offset outwardly of the line of the vehicle side walls 24 and 25. The guide channel members are open at top and bottom and are in vertical alignment with the side extensions of the cross troughs.

The cane cart of this invention is constructed and arranged as aforesaid to cooperate with a specially designed crane in which a boom 37 carries a cross-head 38, from which depend at corner portions thereof four legs 39 pivotally mounted as at 40 and activated in such pivotal motion by hydraulic or other rams 41. At the lower ends of the legs 39 are foot members 42 pivoted to the legs as at 43 and activated in pivotal movement by hydraulic or other rams 44. The rams are subject to the control of the operator of the crane.

In operation, the cane carts of this invention are loaded with harvested canes in the field in the usual manner, the canes being received on the deck 22 and being prevented from shifting longitudinally to any great extent by the end walls 23. The side walls 24 and 25 of the cart body between the pairs of slots 26, 27 and between the end walls 23 and the slots will confine the loose canes in the cart from any escape through the slots.

The deck 22 will afford continuous support to the loose canes in the cart while the slots 26, 27 laterally expose spaced lengths of the canes and give access to the canes by the legs 39.

The loaded carts are driven from the field to the crane station at which a large truck will be waiting having a capacity to receive the loads of several carts and the work of transfer will begin by centering the cross-head 38 of the crane over the cart with the legs 39 in elevated position in alignment with the vertical guide channels defined by the walls 33 and 34 of such channel members. These channel members serve initially as visual aids to the crane operator enabling him to orient the crane legs to accurate positions above and in vertical alignment with the vertical channels before the legs are lowered. When lowered, the legs will have access through the slots 26 and 27 to opposite sides of the loose canes and the foot members 42 will be aligned with the cross trough at which time the crane operator will energize the rams 41 and 44 to move the legs 39 through the slots 26 and 27 in a squeezing operation from opposite directions upon the canes in the cart and at the same time the foot members 42 will be advanced beneath the bundle of canes to the ridge location 30 of the cross trough, that is beneath the canes. The free ends of the foot members will preferably be so formed that they will overlap or interfit in the central position so as to effectively support the bundle of canes when lifted by subsequent raising of the crane cross-head. The bundle of canes is thus removed upwardly from the cart, turned and deposited in the waiting truck.

What is claimed is:

1. A sugar cane vehicle and apparatus for unloading the same comprising
    (a) a wheeled cart suitable for travel in a cane field,
    (b) a substantially solid deck in the cart adapted to support a bundle of loose, canes,
    (c) side walls erected at the sides of the deck for laterally confining the canes in the cart having
    (d) at least one pair of opposed upright slots opening through the upper edges of the side walls,
    (e) channel guide members supported above the side walls in alignment with the slots
    (f) at least one cross trough depressed below deck level opening upwardly through the deck in alignment with the slots and the guide members, said cross trough comprising
    (g) inclined bottom members having lower outer ends projecting beyond the side walls and in substantial alignment with the guide members, said bottom wall converging from said outer end portions mutually upward and meeting in substantially the center portion of the deck, and a crane comprising
    (h) a cross head movable vertically up and down above the cart deck,
    (i) vertically elongated legs pivoted at upper portions thereof to the cross head and extending downwardly and adapted in spread condition to enter the channel guide members and the slots,
    (j) means for moving the lower parts of said legs in lowermost positions toward one another to exert squeezing effect through the slots on the loose bundle of canes to impart movement of the loose canes upwardly in the cart,
    (k) foot members pivoted on the lower ends of the legs adapted to move up the inclined bottom walls of the trough, and
    (l) means for closing the foot members in opposite directions across the lower ends of the legs for assisting the legs to support the loose cane load when the cross head and the legs are subsequently lifted by action of the crane.

2. A sugar cane vehicle as claimed in claim 1 wherein the cart has
    (m) end walls for confining the loose canes from appreciable endwise movement on the deck to orient same with respect to the slots in the side walls.

3. A sugar cane vehicle and apparatus for unloading the same comprising
    (a) a wheeled cart
    (b) a deck in the cart adapted to support a bundle of loose canes,
    (c) side walls erected at the sides of the deck for confining the canes in the cart having
    (d) at least one pair of opposite upright slots,
    (e) upright channel guide members on the side walls offset outwardly of the slots,
    (f) at least one cross trough depressed below deck level opening upwardly through the deck in alignment with the slots and guide members, and a crane comprising
    (g) legs pivoted in the crane adapted in spread positions to enter the upright channel guide members and be guided downwardly thereby incident to lowering movement of the crane,
    (h) foot members pivoted on the lower ends of the legs adapted when inturned to enter the cross trough,
    (i) means for closing the legs through the slots on the opposite sides of the bundle of canes and for moving the foot members toward one another into the cross trough and beneath the bundle of canes to confine the canes and lift the bundle when the crane subsequently elevates the legs, said cross trough having
    (j) extensions projecting outwardly of the side walls to have outer parts thereof in alignment below the guide members,
    (k) bottom walls inclined upwardly and inwardly from outer ends of the trough, and
    (l) side walls on the extension.

References Cited

UNITED STATES PATENTS

| | | | |
|---|---|---|---|
| 1,022,104 | 4/1912 | Miller | 214—650 |
| 1,448,311 | 3/1923 | Miller | 214—38 |

ROBERT G. SHERIDAN, Primary Examiner

U.S. Cl. X.R.

214—650